Jan. 6, 1948.　　　　F. M. BROWN　　　　2,433,826

HAND AND POWER OPERATED STEERING GEAR

Filed June 23, 1945

INVENTOR
F. M. BROWN.
BY [signature]
ATTORNEY.

Patented Jan. 6, 1948

2,433,826

UNITED STATES PATENT OFFICE 2,433,826

HAND AND POWER OPERATED STEERING GEAR

Franklin M. Brown, Portland, Oreg., assignor of one-half to Glenn Moore, Portland, Oreg.

Application June 23, 1945, Serial No. 601,165

5 Claims. (Cl. 74—407)

This invention relates generally to devices for selectively applying power to a rudder or other device either manually or from a prime mover without disengaging any of the members or performing any action other than the application of power in the manner intended.

The main object of this invention is to construct a device of the class described by means of which a boat may be steered manually or by means of a motor and in which both of the controls are operative at all times and the driving connection thereto being operative, and the selection of the drive being entirely within the control of the operator.

I accomplish these and other objects in the manner set forth in the following specification, as illustrated in the accompanying drawing in which.

Figure 3:
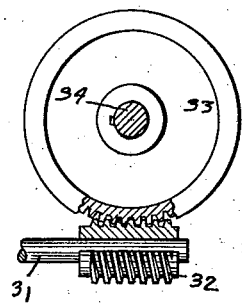
Fig. 3 is a plan taken along the line 3—3 in Fig. 1 with portions broken away in section.
Figure 4:
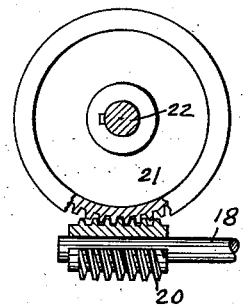
Fig. 4 is a plan taken along the line 4—4 in Fig. 1 with portions broken away in section.
Figure 2:
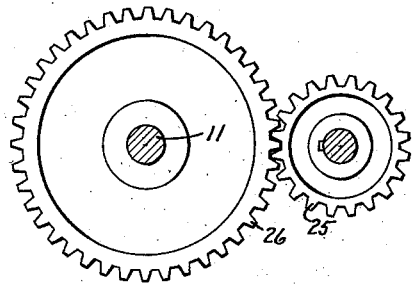
Fig. 2 is a section taken along the line 2—2 in Fig. 1.
Figure 1:
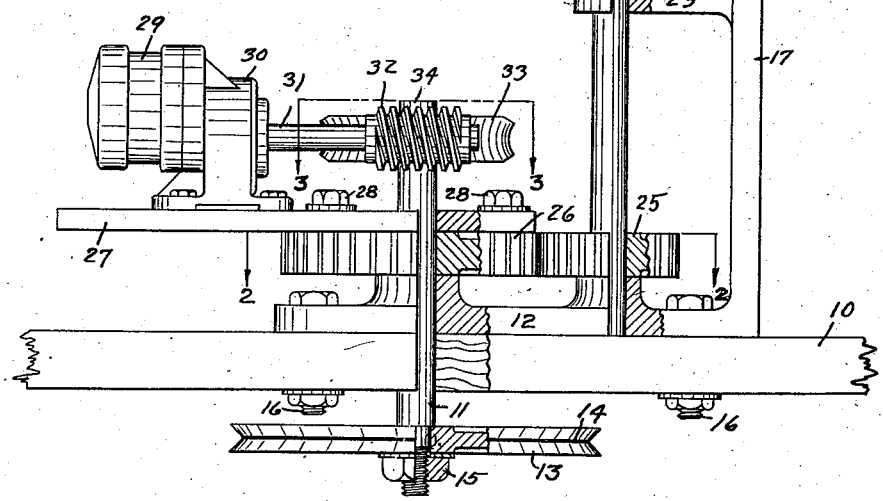
Fig. 1 is a side elevation of the device with parts thereof broken away in vertical section.

In order to simplify the illustration and explanation of this device, only those portions thereof as are intimately related thereto will be illustrated or described.

Similar numerals refer to similar parts throughout the several views.

Referring in detail to the drawing there is shown a deck 10 through which extends a vertical spindle 11 which journals in the base 12. On the lower end of the spindle 11 is secured the grooved pulley 13 around which passes the rudder line 14. The pulley 13 is secured on the spindle 11 by means of the note 15.

The base 12 is secured to the deck 10 by means of the bolts 16 and has formed thereon the upright standard 17 on whose upper end is disposed the horiontal shaft 18 on whose outer end is secured the steering wheel 19.

Secured on the shaft 18 is a worm 20 which meshes with the wheel 21 on the vertical shaft 22 which journals in the bearing 23 and in the base 12. Obviously, the location and type of bearings is largely diagrammatic, and is used for illustrative purposes only.

Keyed on the shaft 22 is a spur pinion 25 which meshes with the spur gear 26 which is free to rotate on the spindle 11. The part of the device thus far described pertains to the manual operation of the steering mechanism.

Secured on the gear 26 is a base plate 27 by means of the bolts 28. Mounted on the plate 27 is a motor 29 and reduction gearing 30 whose power output shaft 31 has secured thereon a worm 32 which meshes with a worm wheel 33 secured on the upper end 34.

The operation of the steering gear is as follows:

If it is desired to operate the steering pulley 13 by power from the motor 29 which must, of necessity, be a reversible motor, it is only necessary to close the motor circuit in a manner to cause the shaft 31 to turn in the proper direction so that it will cause the shaft 11 to rotate as desired. It will be noted that the gear 26 which carries the motor 29 cannot revolve because it is held by the pinion 25 and the worm and wheel 20 and 21 which are being operated.

If on the other hand it should be desirable to operate the steering manually, then the pilot merely turns the wheel 19 in the direction desired, which through the worm and wheel 20 and 21, and the gears 25 and 26 causes the motor 29 to swing in a circular orbit about the wheel 33 and thereby cause a rotation of the shaft 11, thus making it possible to operate the pulley 14 manually; or under the power from the motor 29, or the two drives may be used in unison.

Numerous adaptations may be made of this arrangement, and the one illustrated is shown as best setting forth the principle involved.

I claim:

1. A steering gear of the class described having in combination a steering pulley, a shaft upon which said pulley is mounted, a gear revolvable on said shaft, a motor operatively supported on said gear having a driving connection to said shaft, and a manually operated steering wheel having irreversible gearing for driving said motor supporting gear.

2. In a combined power and manually driven steering gear, the combination of a steering pulley with a motor for driving said pulley including an irreversible gearing between said motor and pulley, a revolvable gear operatively supporting said motor, a pinion meshing with said gear and an irreversible manually operated steering wheel for driving said gears manually.

3. A steering gear consisting of a base having a vertical shaft journaled therein, a steering pulley secured on the lower end of said shaft, a worm wheel secured on the upper end of said shaft, a spur gear rotatably mounted on said shaft below said worm wheel, a base plate secured on said spur gear, a motor mounted on said base plate, a worm driven by said motor and meshing with said worm wheel and manually operated.

4. In a steering gear of the class described, the combination of a base having a pair of vertical shafts revolvably mounted thereon, each of said shafts having a worm and wheel connection at the upper end thereof for driving same, the worm on one of said shafts having a manually operated steering wheel drive, the worm on the second shaft having an electric motor for driving same, a spur gear revolvably mounted on said second shaft including means for supporting said motor thereon, a spur pinion secured on the lower end of said manually driven shaft meshing with said motor carrying spur gear, and a grooved pulley secured on the lower end of said second shaft on which a steering cable can be wound.

5. The combination of a base, a sheave for winding a steering cable mounted under said base, a vertical shaft journaling in said base and secured to said sheave, a spur gear revolvably mounted on said shaft, a motor mounted on said spur gear having irreversible worm wheel drive to said shaft, a manually operated steering wheel having an irreversible worm and wheel drive, a shaft driven therefrom having a pinion at the lower end of said shaft meshing with the spur gear in said first mentioned shaft whereby the revolution of said manually operated steering wheel will cause said motor to revolve in a horizontal plane, and whereby the operation of said motor will cause its shaft to rotate in a fixed plane.

FRANKLIN M. BROWN.

REFERENCES CITED

The following references are of record in the file of this patent:

UNITED STATES PATENTS

| Number | Name | Date |
|---|---|---|
| 2,294,906 | Holloman et al. | Sept. 8, 1942 |
| 2,307,781 | Holloman et al. | Jan. 12, 1943 |
| 778,710 | Robinson | Dec. 27, 1904 |